United States Patent
Wang et al.

(10) Patent No.: US 8,154,492 B2
(45) Date of Patent: Apr. 10, 2012

(54) LIQUID CRYSTAL DISPLAY PANEL

(75) Inventors: Wen-Chun Wang, Taichung (TW); Yi-Chin Wang, Taichung County (TW); Yi-Cheng Tsai, Chiayi County (TW)

(73) Assignee: Wintek Corporation, Taichung (TW)

( * ) Notice: Subject to any disclaimer, the term of this patent is extended or adjusted under 35 U.S.C. 154(b) by 460 days.

(21) Appl. No.: 12/429,184

(22) Filed: Apr. 24, 2009

(65) Prior Publication Data
US 2009/0268114 A1 Oct. 29, 2009

(30) Foreign Application Priority Data
Apr. 25, 2008 (TW) .............................. 97115368 A

(51) Int. Cl.
*G09G 3/36* (2006.01)
(52) U.S. Cl. ........................................... 345/87; 349/38
(58) Field of Classification Search .................. 345/87; 349/33, 38, 114
See application file for complete search history.

(56) References Cited

U.S. PATENT DOCUMENTS
| | | | |
|---|---|---|---|
| 6,950,158 B2 * | 9/2005 | Chang | 349/114 |
| 6,980,270 B2 * | 12/2005 | Tsuda et al. | 349/114 |
| 7,973,757 B2 * | 7/2011 | Lee et al. | 345/100 |

* cited by examiner

*Primary Examiner* — Abbas Abdulselam
(74) *Attorney, Agent, or Firm* — Jianq Chyun IP Office

(57) ABSTRACT

A liquid crystal display panel including an active device array substrate, an opposite substrate, and a liquid crystal layer is provided. The active device array substrate has at least one pixel unit including two active devices, two first pixel electrodes, and two common lines. Each of the active devices has a gate, a source, and a drain. The gates are connected with one another, the sources are connected with one another, and the pixel electrodes are connected with the drains. A first signal source connected with one of the common lines is different from a second signal source connected with the other one of the common lines. The opposite substrate has a common electrode connected with the first signal source. The liquid crystal layer is disposed between the active device array substrate and the opposite substrate.

10 Claims, 8 Drawing Sheets

LIQUID CRYSTAL DISPLAY PANEL

CROSS-REFERENCE TO RELATED APPLICATION

This application claims the priority benefit of Taiwan application serial No. 97115368, filed on Apr. 25, 2008. The entirety of the above-mentioned patent application is hereby incorporated by reference herein and made a part of this specification.

BACKGROUND OF THE INVENTION

1. Field of the Invention

In the conventional transflective LCD (TR-LCDs), each of the pixel units has a transparent region and a reflective region. The transparent region uses a backlight as a light source, and the reflective region uses an external ambient light as the light source. In order to present similar display effect at both the reflective region and the transparent region, usually, an organic layer may be disposed on the reflective region to elevate a reflective pixel electrode, so as to form the TR-LCD having a dual cell gap.

The thickness of the organic layer formed in the reflective region is likely to be nonuniform; therefore, the transmittance of the LCD panel, the contrast of the image, and colors of the image are nonuniform.

SUMMARY OF THE INVENTION

Accordingly, an embodiment of the present invention is directed to a transflective LCD panel, adapted to reduce a color shift effect of an image.

Another embodiment of the present invention is directed to a transflective LCD panel having a single cell gap.

An embodiment of the present invention provides an LCD panel, which includes an active device array substrate, an opposite substrate, and a liquid crystal layer. The active device array substrate has multiple pixel units. Each of the pixel unit includes a first active device, a second active device, a first pixel electrode, a second pixel electrode, a first common line, and a second common line. The first active device has a first gate, a first source, and a first drain. The second active device has a second gate, a second source, and a second drain. The first gate is connected to the second gate, and the first source is connected to the second source. The first pixel electrode is connected to the first drain, and the second pixel electrode is connected to the second drain. The first common line is connected to a first signal source, the second common line is connected to a second signal source, and the first signal source is different from the second signal source. The opposite substrate has a common electrode connected to the first signal source. The liquid crystal layer is disposed between the active device array substrate and the opposite substrate.

In an embodiment of the present invention, the first signal source is adapted to provide a first voltage $\Delta Vcom1$, such that a coupling voltage $\Delta V1$ of the first pixel electrode is equal to $$\Delta V1 = \Delta Vcom1 \cdot \frac{Clc + Cst}{Cgs + Clc + Cst},$$

wherein Cst is a storage capacitance formed by the first common line and the first drain, Cgs is a parasitic capacitance formed by the first gate and the first source, and Clc is a liquid crystal capacitance formed by the first pixel electrode and the common electrode.

In an embodiment of the present invention, the first signal source is adapted to provide a first voltage $\Delta Vcom1$, and the second signal source is adapted to provide a second voltage $\Delta Vcom2$, such that a coupling voltage $\Delta V2$ of the second pixel electrode is equal to $$\Delta V2 = \Delta Vcom1 \cdot \frac{Clc}{Cgs + Clc + Cst} + \Delta Vcom2 \cdot \frac{Cst}{Cgs + Clc + Cst},$$

wherein Cst is a storage capacitance formed by the second common line and the second drain, Cgs is a parasitic capacitance formed by the second gate and the second source, and Clc is a liquid crystal capacitance formed by the second pixel electrode and the common electrode.

In an embodiment of the present invention, one of the first pixel electrode and the second pixel electrode is a transparent pixel electrode, and the other one of the first pixel electrode and the second pixel electrode is a reflective pixel electrode.

In an embodiment of the present invention, one of the first pixel electrode and the second pixel electrode is a first transparent pixel electrode, and the other one of the first pixel electrode and the second pixel electrode includes a second transparent pixel electrode and a reflective pixel electrode. The second transparent pixel electrode is disposed on the reflective pixel electrode.

In an embodiment of the present invention, one of the first pixel electrode and the second pixel electrode is a first transparent pixel electrode, and the other one of the first pixel electrode and the second pixel electrode includes a second transparent pixel electrode and a reflective pixel electrode. The reflective pixel electrode is disposed on the second transparent pixel electrode.

In an embodiment of the present invention, the active device array substrate further includes a cover layer. The cover layer covers the first active device, the second active device, the first common line, the second common line, a part of the first transparent pixel electrode and the second transparent pixel electrode. The reflective pixel electrode covers the cover layer and passes through the cover layer, so as to connect the second transparent pixel electrode.

In an embodiment of the present invention, the active device array substrate further includes a cover layer. The cover layer covers the first active device, the second active device, the first common line, the second common line, the first transparent pixel electrode, and the second transparent pixel electrode. Further, the reflective pixel electrode covers a part of the cover layer and passes through the cover layer, so as to connect the second transparent pixel electrode.

An embodiment of the present invention further provides an LCD panel, which includes an active device array substrate, an opposite substrate, and a liquid crystal layer. The active device array substrate has multiple pixel units. Each of the pixel unit includes a first active device, a second active device, a first pixel electrode, a second pixel electrode, a first common line, and a second common line. The first active device has a first gate, a first source, and a first drain. The second active device has a second gate, a second source, and a second drain. The first gate is connected to the second gate, and the first source is connected to the second source. The first pixel electrode is connected to the first drain, and the second pixel electrode is connected to the second drain. The first common line is connected to a first signal source, the second common line is connected to a second signal source, and the first signal source is different from the second signal source. The opposite substrate has a common electrode, and the common electrode includes a first common sub-electrode and a second common sub-electrode. The first common sub-electrode is connected to the first signal source, the second common sub-electrode is connected to a third signal source, and the third signal source is different from the first signal source and the second signal source. The liquid crystal layer is disposed between the active device array substrate and the opposite substrate.

In an embodiment of the present invention, the first signal source is adapted to provide a first voltage ΔVcom1, such that a coupling voltage ΔV1 of the first pixel electrode is equal to $$\Delta V1 = \Delta Vcom1 \cdot \frac{Clc + Cst}{Cgs + Clc + Cst},$$

wherein Cst is a storage capacitance formed by the first common line and the first drain, Cgs is a parasitic capacitance formed by the first gate and the first source, and Clc is a liquid crystal capacitance formed by the first pixel electrode and the common electrode.

In an embodiment of the present invention, the second signal source is adapted to provide a second voltage ΔVcom2, and the third signal source is adapted to provide a third voltage ΔVcom3, such that a coupling voltage ΔV2 of the second pixel electrode is equal to $$\Delta V2 = \Delta Vcom2 \cdot \frac{Clc}{Cgs + Clc + Cst} + \Delta Vcom3 \cdot \frac{Cst}{Cgs + Clc + Cst},$$

wherein Cst is a storage capacitance formed by the second common line and the second drain, Cgs is a parasitic capacitance formed by the second gate and the second source, and Clc is a liquid crystal capacitance formed by the second pixel electrode and the common electrode.

In an embodiment of the present invention, one of the first pixel electrode and the second pixel electrode is a transparent pixel electrode, and the other one of the first pixel electrode and the second pixel electrode is a reflective pixel electrode.

In an embodiment of the present invention, one of the first pixel electrode and the second pixel electrode is a first transparent pixel electrode, and the other one of the first pixel electrode and the second pixel electrode includes a second transparent pixel electrode and a reflective pixel electrode. The second transparent pixel electrode is disposed on the reflective pixel electrode.

In an embodiment of the present invention, one of the first pixel electrode and the second pixel electrode is a first transparent pixel electrode, and the other one of the first pixel electrode and the second pixel electrode includes a second transparent pixel electrode and a reflective pixel electrode. The reflective pixel electrode is disposed on the second transparent pixel electrode.

In an embodiment of the present invention, the active device array substrate further has a cover layer. The cover layer covers the first active device, the second active device, the first common line, the second common line, a part of the first transparent pixel electrode and the second transparent pixel electrode. The reflective pixel electrode covers the cover layer and passes through the cover layer, so as to connect the second transparent pixel electrode.

In an embodiment of the present invention, the active device array substrate further has a cover layer. The cover layer covers the first active device, the second active device, the first common line, the second common line, the first transparent pixel electrode, and the second transparent pixel electrode. The reflective pixel electrode covers a part of the cover layer and passes through the cover layer, so as to connect the second transparent pixel electrode.

In the present invention, the first common line and the second common line receive different voltages, such that the first pixel electrode and the second pixel electrode may have different coupling voltages. Therefore, the color shift effect of the image may be compensated, since a rotating angle of the liquid crystals of the first pixel electrode in the liquid crystal layer is different from a rotating angle of the liquid crystals of the second pixel electrode.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
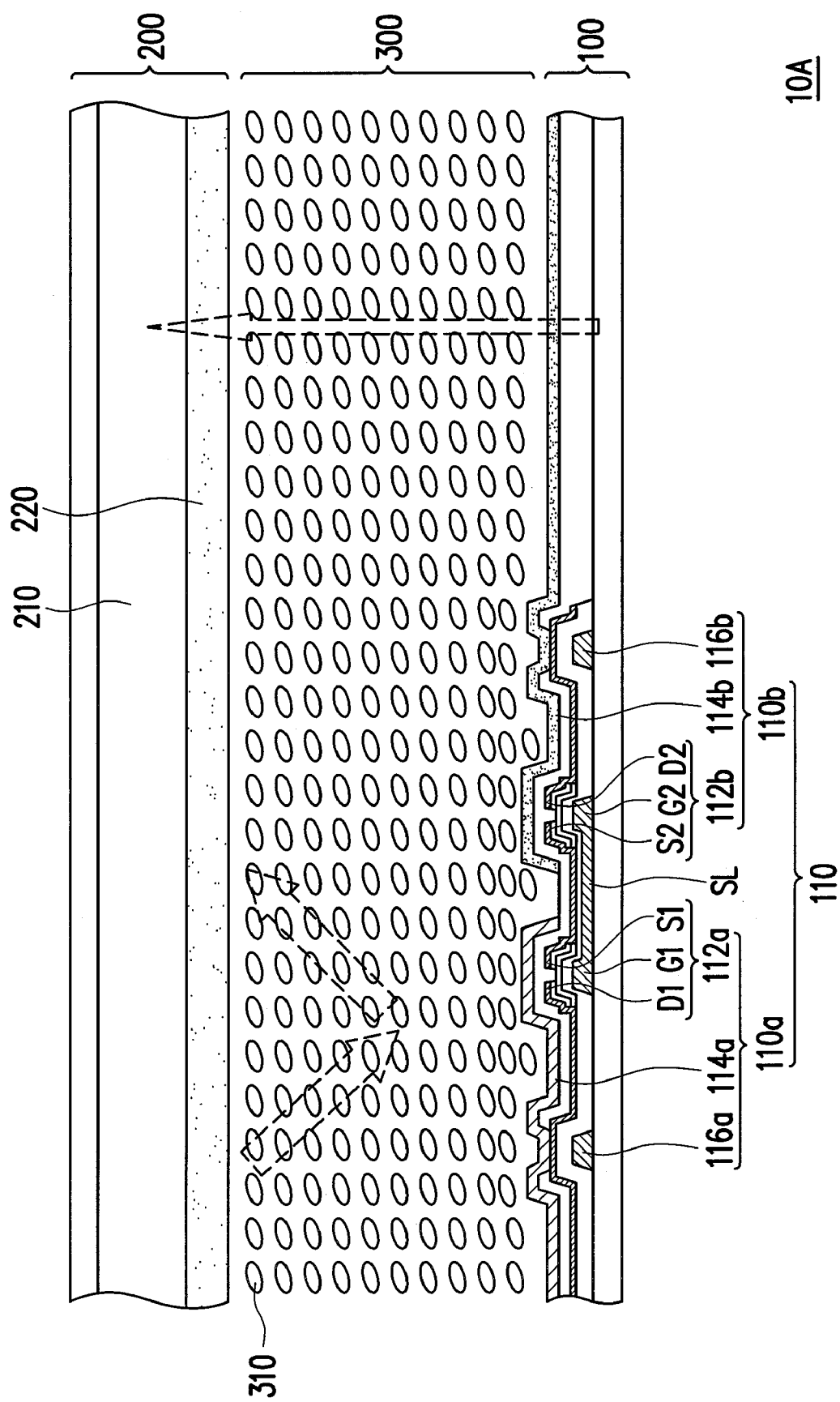
FIG. 1A is a schematic structural view of an LCD panel according to an embodiment of the present invention.

Reference will now be made in detail to the present embodiments of the invention, examples of which are illustrated in the accompanying drawings. Wherever possible, the same reference numbers are used in the drawings and the description to refer to the same or similar parts.

Figure 1B:
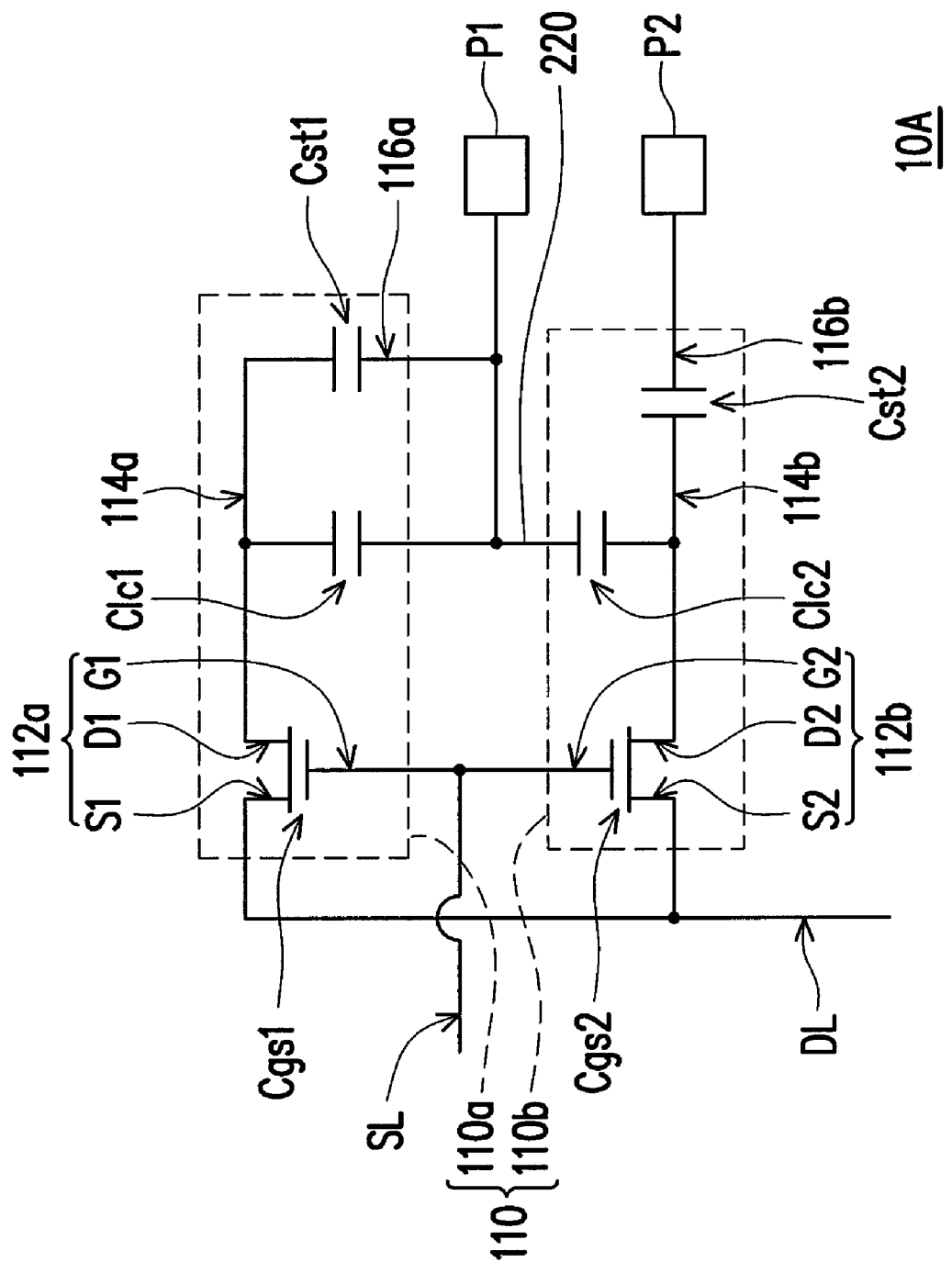
FIG. 1B is an equivalent circuit diagram of the LCD panel in FIG. 1A.

FIG. 1A is a schematic structural view of an LCD panel according to an embodiment of the present invention, and FIG. 1B is an equivalent circuit diagram of the LCD panel in FIG. 1A. Referring to FIGS. 1A and 1B, in this embodiment, the LCD panel is, for example, a transflective LCD (TR-LCD) panel with a single cell gap. However, the present invention is not limited to the following embodiments.

The LCD panel 10A includes an active device array substrate 100, an opposite substrate 200, and a liquid crystal layer 300 disposed between the active device array substrate 100 and the opposite substrate 200. The liquid crystal layer 300 has a plurality of liquid crystals 310, and the active device array substrate 100 has at least one pixel unit 110. The pixel unit 110 may be divided into a reflective sub-pixel unit 110a and a transparent sub-pixel unit 110b. In order to simplify the drawings, only one pixel unit 110 is shown in the following embodiment.

In this embodiment, the reflective sub-pixel unit 110a may include a first active device 112a, a first pixel electrode 114a, and a first common line 116a. Further, the transparent sub-pixel unit 110b may include a second active device 112b, a second pixel electrode 114b, and a second common line 116b.

The first active device 112a is, for example, a thin film transistor (TFT), and has a first gate G1, a first source S1, and a first drain D1. Further, the second active device 112b is, for example, also a TFT, and has a second gate G2, a second source S2, and a second drain D2. The first gate G1 and the second gate G2 are connected to a scan line SL, and the first source S1 and the second source S2 are connected to a data line DL. Further, the first gate G1 and the first source S1 may form a first parasitic capacitance Cgs1, and the second gate G2 and the second source S2 may form a second parasitic capacitance Cgs2. The first parasitic capacitance Cgs1 and the second parasitic capacitance Cgs2 may have the same capacitance value Cgs.

In addition, the first pixel electrode 114a is, for example, a reflective pixel electrode and is connected to the first drain D1, and the second pixel electrode 114b is, for example, a transparent pixel electrode and is connected to the second drain D2. Further, the first common line 116a is connected to a first signal source P1 and may form a first storage capacitance Cst1 with the first drain D1, and the second common line 116b is connected to a second signal source P2 and may form a second storage capacitance Cst2 with the second drain D2. The first signal source P1 is different from the second signal source P2, and the first storage capacitance Cst1 and the second storage capacitance Cst2 may have the same capacitance value Cst.

In addition, the opposite substrate 200 is, for example, a color filter substrate, and has a color filter pattern 210 and a common electrode 220. The common electrode 220 is disposed on the color filter pattern 210, and is connected to the first signal source P1. Further, the first pixel electrode 114a may form a first liquid crystal capacitance Clc1 with the common electrode 220, and the second pixel electrode 114b may form a second liquid crystal capacitance Clc2 with the common electrode 220. The first liquid crystal capacitance Clc1 and the second liquid crystal capacitance Clc2 may have the same capacitance value Clc.

When the first gate G1 receives a voltage through the scan line SL to conduct the first source S1 and the first drain D1, the first liquid crystal capacitance Clc1 and the first storage capacitance Cst1 may be charged through the data line DL. At the same time, the second gate G2 may also receive the same voltage through the scan line SL to conduct the second source S2 and the second drain D2, such that the second liquid crystal capacitance Clc2 and the second storage capacitance Cst2 are charged through the data line DL.

At this time, if the first signal source P1 and the second signal source P2 respectively provide a first voltage ΔVcom1 and a second voltage ΔVcom2, a coupling voltage ΔV1 of the first pixel electrode 114a and a coupling voltage ΔV2 of the second pixel electrode 114b may be respectively equal to $$\Delta V1 = \Delta Vcom1 \cdot \frac{Clc + Cst}{Cgs + Clc + Cst}$$

and $$\Delta V2 = \Delta Vcom1 \cdot \frac{Clc}{Cgs + Clc + Cst} + \Delta Vcom2 \cdot \frac{Cst}{Cgs + Clc + Cst}.$$

It may be known from the embodiment that when the first voltage ΔVcom1 is different from the second voltage ΔVcom2, the coupling voltage ΔV1 of the first pixel electrode 114a may be different from the coupling voltage ΔV2 of the second pixel electrode 114b. At this time, the potential difference between two ends of the first liquid crystal capacitance Clc1 may be different from the potential difference between two ends of the second liquid crystal capacitance Clc2. In this manner, the rotating angle of the liquid crystals 310 located between the first pixel electrode 114a and the common electrode 220 may be different from the rotating angle of the liquid crystals 310 located between the second pixel electrode 114b and the common electrode 220, such that the transmittance of the reflective sub-pixel unit 110a is different from the transmittance of the transparent sub-pixel unit 110b. Therefore, two different characteristic curves are created. That is, applied voltage vs. the transmittance of the reflective sub-pixel unit (V-R) characteristic curve correspond to the reflective sub-pixel unit 110a and applied voltage vs. the transmittance of the transparent sub-pixel unit (V-T) characteristic curve respectively correspond to transparent sub-pixel unit 110b. The two different characteristic curves can be respectively adjusted to meet design requirement. In another embodiment, when the reflective sub-pixel unit 110a is substituted by another transparent sub-pixel unit, two different characteristic curves can be utilized to compensate the color shift effect of the image in large viewing angle.

Figure 2A:
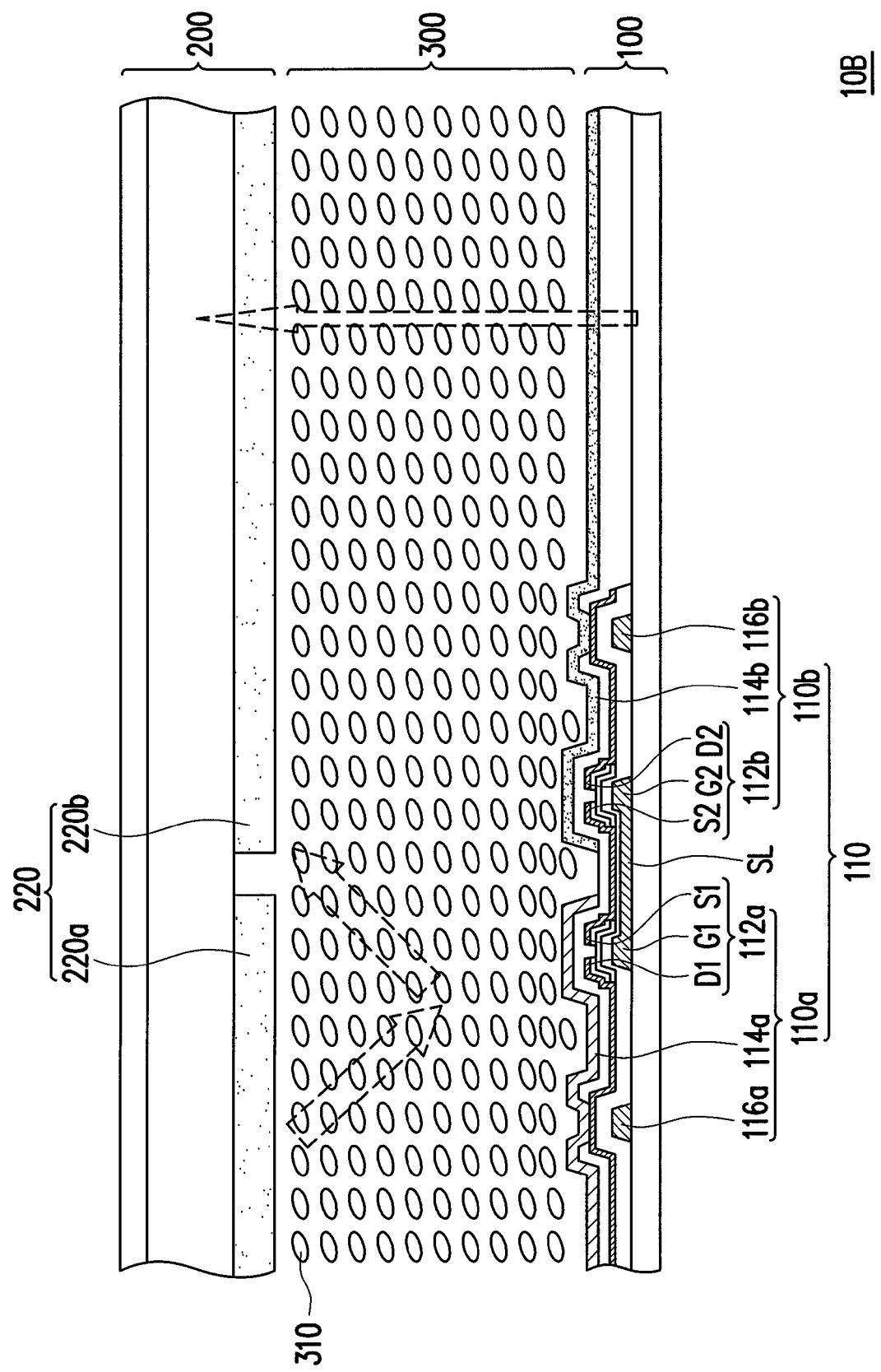
FIG. 2A is a schematic structural view of an LCD panel according to another embodiment of the present invention.
Figure 2B:
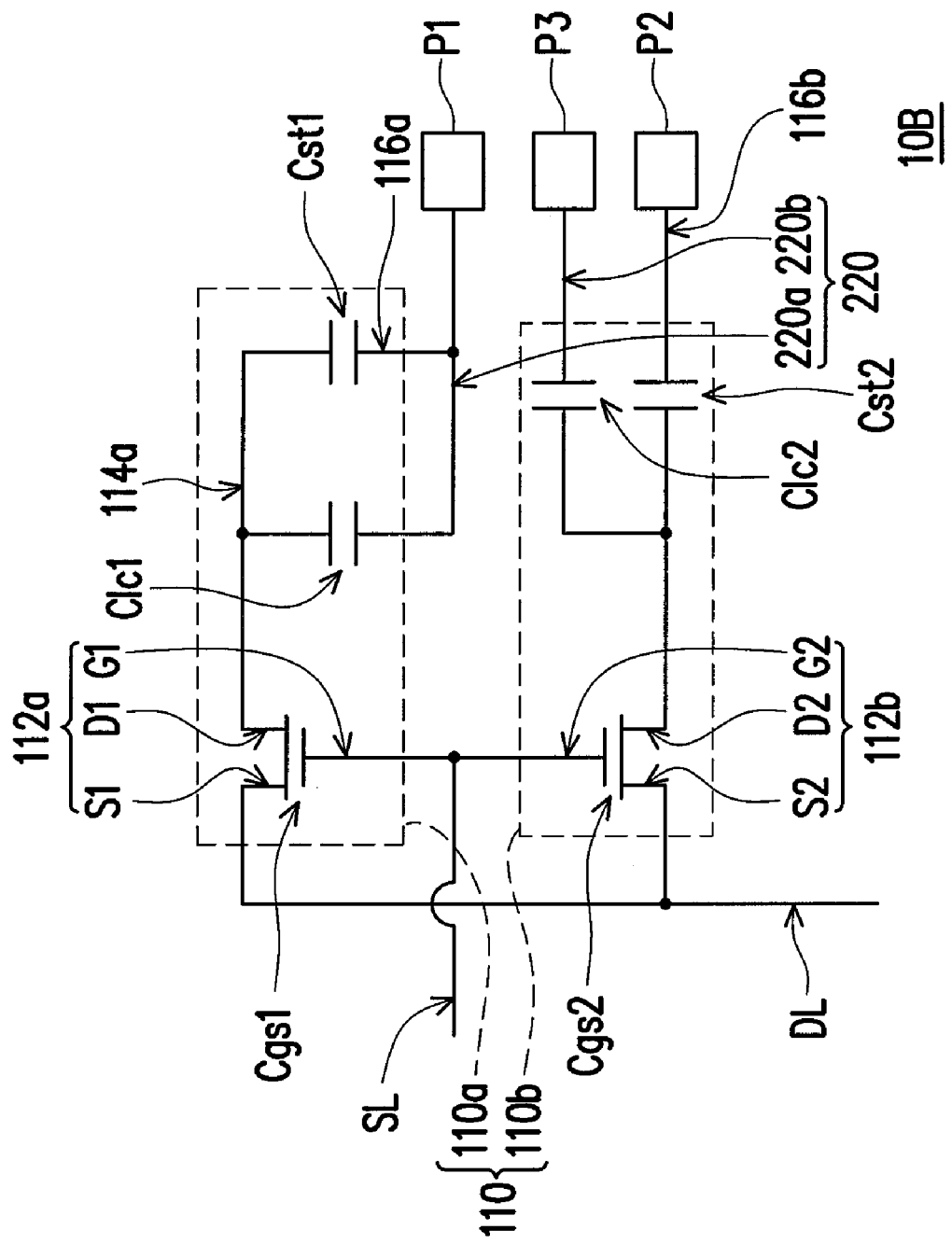
FIG. 2B is an equivalent circuit diagram of the LCD panel in FIG. 2A.

FIG. 2A is a schematic structural view of an LCD panel according to another embodiment of the present invention, and FIG. 2B is an equivalent circuit diagram of the LCD panel in FIG. 2A. Referring to FIGS. 2A and 2B, the structure and the circuit layout of the LCD panel 10B in FIGS. 2A and 2B are similar to the structure and the circuit layout of the LCD panel 10A in FIGS. 1A and 1B, except that the common electrode 220 is formed by a first common sub-electrode 220a and a second common sub-electrode 220b. The first common sub-electrode 220a may correspond to the first pixel electrode 114a and connect to the first signal source P1. The second common sub-electrode 220b may correspond to the second pixel electrode 114b and connect to a third signal source P3. The third signal source P3 is different from the first signal source P1 and the second signal source P2.

When the first signal source P1, the second signal source P2, and the third signal source P3 respectively provide a first voltage ΔVcom1, a second voltage ΔVcom2, and a third voltage ΔVcom3. A coupling voltage ΔV1 of the first pixel electrode 114a and a coupling voltage ΔV2 of the second pixel electrode 114b may be respectively equal to $$\Delta V1 = \Delta Vcom1 \cdot \frac{Cls + Cst}{Cgs + Clc + Cst}$$

and $$\Delta V2 = \Delta Vcom2 \cdot \frac{Clc}{Cgs + Clc + Cst} + \Delta Vcom3 \cdot \frac{Cst}{Cgs + Clc + Cst}.$$

In this embodiment, when the first voltage ΔVcom1, the second voltage ΔVcom2, and the third voltage ΔVcom3 are different, the coupling voltage ΔV1 of the first pixel electrode 114a may be different from the coupling voltage ΔV2 of the second pixel electrode 114b. Therefore, in this embodiment, the color shift effect of the image may be compensated.

Figure 3:
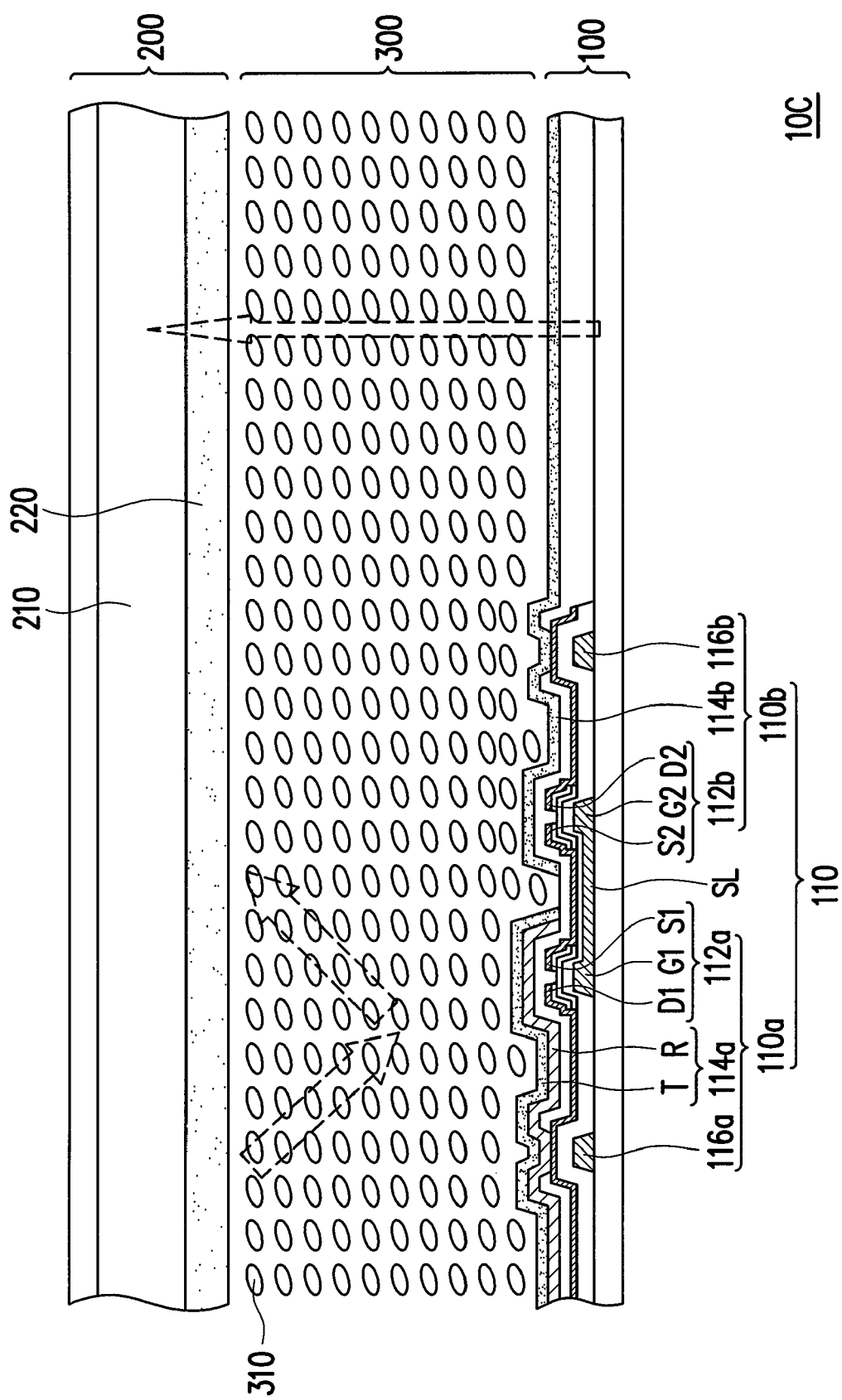
FIGS. 3 to 6 are schematic structural views of an LCD panel according to other embodiments of the present invention.

FIGS. 3 to 6 are schematic structural views of an LCD panel according other embodiments of the present invention. First, referring to FIG. 3, the structure of the LCD panel 10C in FIG. 3 is similar to the structure of the LCD panel 10A in FIG. 1, except that the first pixel electrode 114a of the LCD panel 10C is formed by a reflective pixel electrode R and a transparent pixel electrode T covered on the reflective pixel electrode R.

Figure 4:
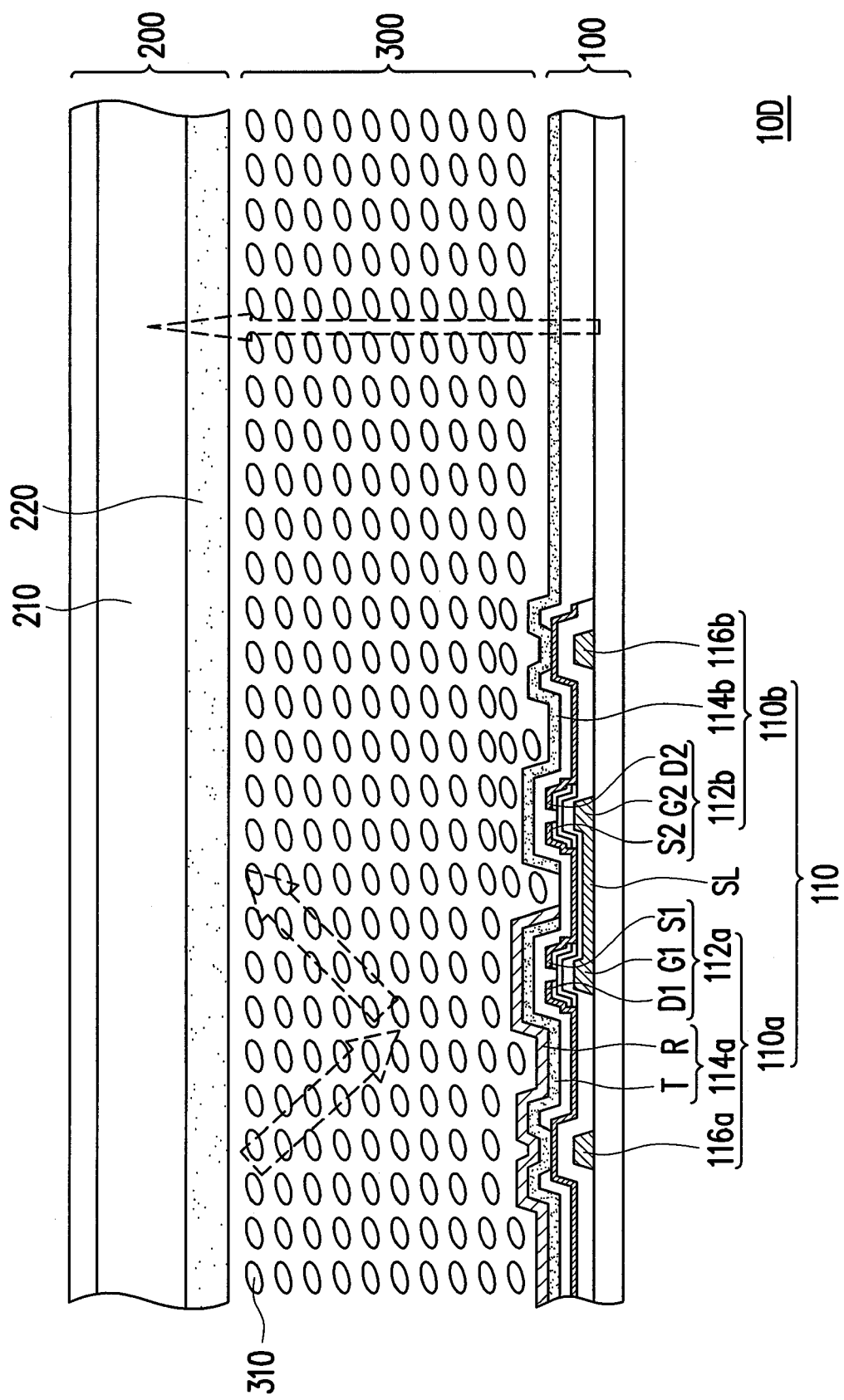

Further, referring to FIG. 4, the structure of the LCD panel 10D in FIG. 4 is similar to the structure of the LCD panel 10C in FIG. 3, except that the transparent pixel electrode T is disposed below the reflective pixel electrode R.

Figure 5:
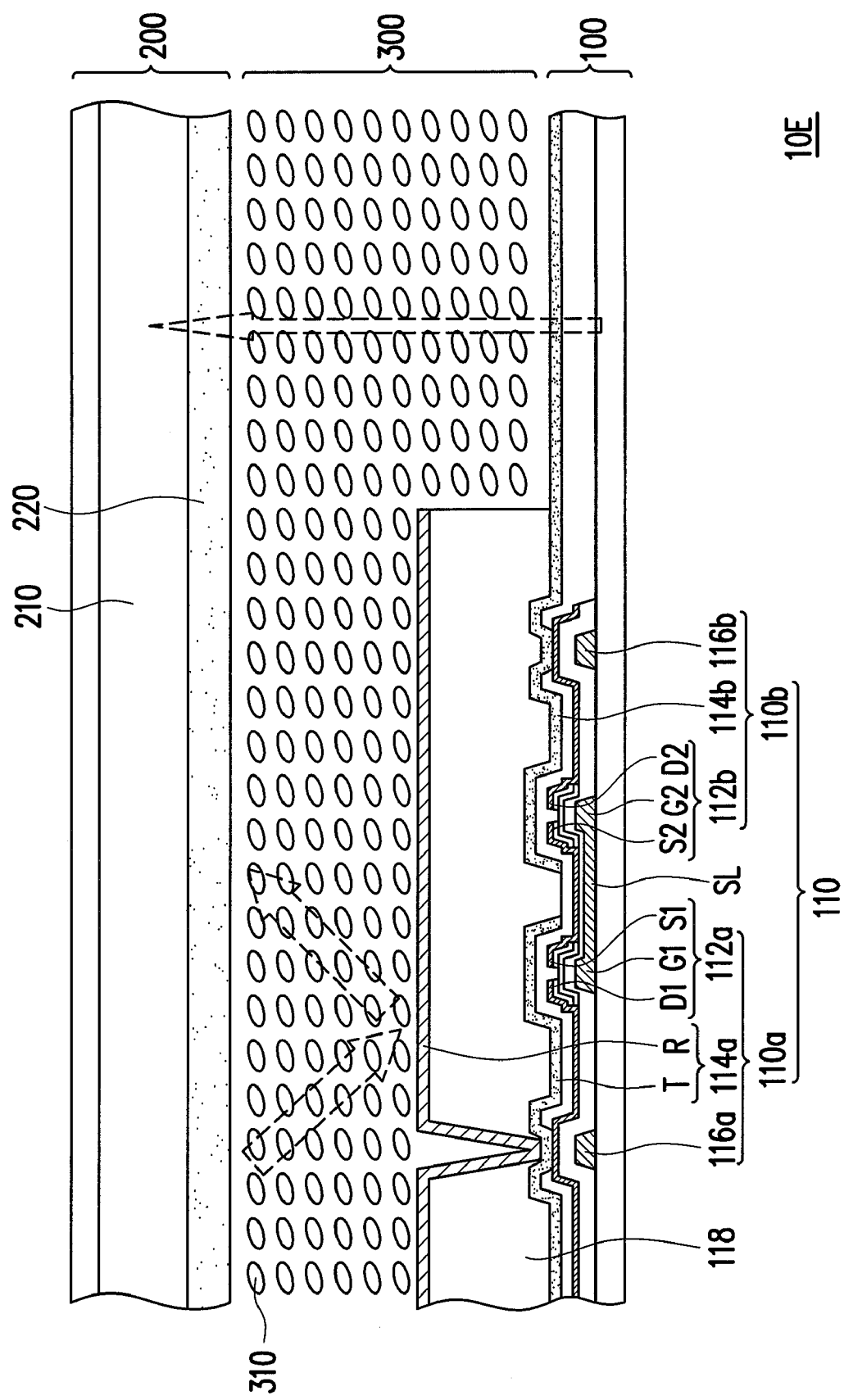

In addition, referring to FIG. 5, the LCD panel 10E in FIG. 5 is a TR-LCD panel with a dual cell gap. In this embodiment, the first pixel electrode 114a is formed by a reflective pixel electrode R and a transparent pixel electrode T electrically connected to the reflective pixel electrode R, and the second pixel electrode 114b is another transparent pixel electrode. In addition, the active device array substrate 100 further has a cover layer 118 covering the first active device 114a, the second active device 114b, the first common line 116a, the second common line 116b, the transparent pixel electrode T, and a part of the second pixel electrode 114b. The reflective pixel electrode R disposed on the cover layer 118 and connects the transparent pixel electrode T.

Figure 6:
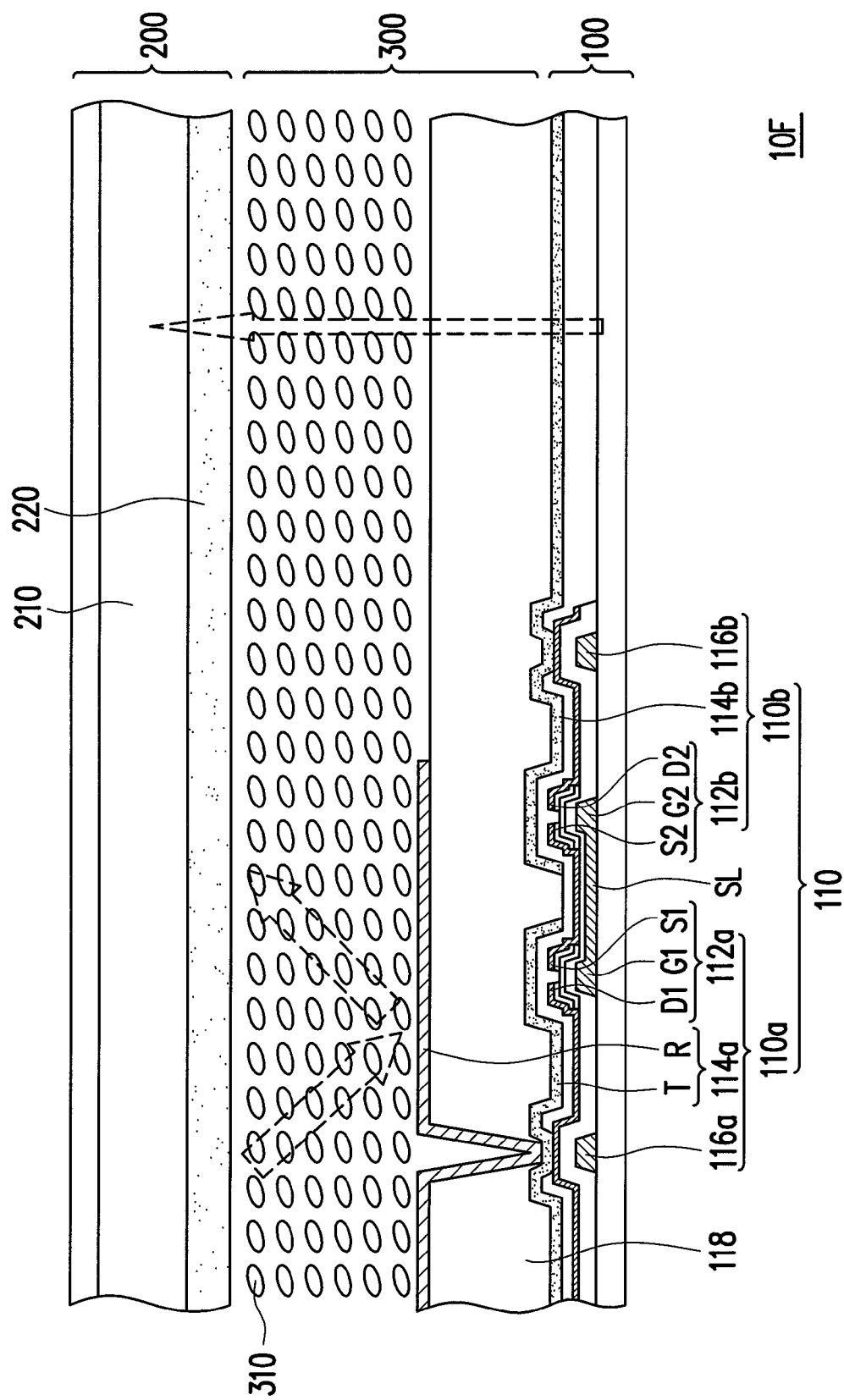

In addition, referring to FIG. 6, the structure of the LCD panel 10F in FIG. 6 is similar to the structure of the LCD panel 10E in FIG. 5, except that the cover layer 118 of the LCD panel 10F covers the overall second pixel electrode 114b, and the reflective pixel electrode R only covers a part of the cover layer 118.

Similarly, in the embodiments of FIGS. 3 to 6, when the first voltage ΔVcom1 is different from the second voltage ΔVcom2, the coupling voltage ΔV1 of the first pixel electrode 114a may be different from the coupling voltage ΔV2 of the second pixel electrode 114b. Therefore, in this embodiment, the color shift effect of the image may be compensated.

To sum up, each pixel structure of the present invention may have two common lines and two pixel electrodes, and the two common lines are connected to different signal sources. Therefore, when the common lines are provided with difference voltages from different signal sources, the pixel electrodes may have different coupling voltages.

In addition, the common electrode may be divided into two different common sub-electrodes, and the two common sub-electrodes may correspond to different pixel electrodes and connect to different signal sources. Therefore, when the common lines and the common sub-electrodes are provided with difference voltages from different signal sources, the pixel electrodes may also have different coupling voltages.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
  an active device array substrate, comprising a plurality of pixel units, wherein each of the pixel unit comprises:
    a first active device, comprising a first gate, a first source, and a first drain;
    a second active device, comprising a second gate, a second source, and a second drain, wherein the first gate is connected to the second gate, and the first source is connected to the second source;
    a first pixel electrode, connected to the first drain;
    a second pixel electrode, connected to the second drain;
    a first common line, connected to a first signal source;
    a second common line, connected to a second signal source, wherein the first signal source is different from the second signal source; and
  an opposite substrate, comprising a common electrode connected to the first signal source; and
  a liquid crystal layer, disposed between the active device array substrate and the opposite substrate, wherein the first signal source is adapted to provide a first voltage ΔVcom1, such that a coupling voltage ΔV1 of the first pixel electrode is equal to $$\Delta V1 = \Delta Vcom1 \cdot \frac{Clc + Cst}{Cgs + Clc + Cst},$$

wherein Cst is a storage capacitance formed by the first common line and the first drain,
  Cgs is a parasitic capacitance formed by the first gate and the first source,
  Clc is a liquid crystal capacitance formed by the first pixel electrode and the common electrode, and
  the second signal source is adapted to provide a second voltage ΔVcom2, such that a coupling voltage ΔV2 of the second pixel electrode is equal to $$\Delta V2 = \Delta Vcom1 \cdot \frac{Clc}{Cgs + Clc + Cst} + \Delta Vcom2 \cdot \frac{Cst}{Cgs + Clc + Cst},$$

wherein Cst is a storage capacitance formed by the second common line and the second drain,
  Cgs is a parasitic capacitance formed by the second gate and the second source,
  Clc is a liquid crystal capacitance formed by the second pixel electrode and the common electrode.

2. The LCD panel according to claim 1, wherein one of the first pixel electrode and the second pixel electrode is a transparent pixel electrode, and the other one of the first pixel electrode and the second pixel electrode is a reflective pixel electrode.

3. The LCD panel according to claim 2, wherein the reflective pixel electrode connects to another transparent pixel electrode that is disposed below the reflective pixel electrode.

4. The LCD panel according to claim 3, wherein the active device array substrate further comprises a cover layer covering the first active device, the second active device, the first common line, the second common line, the transparent pixel electrode, and the reflective pixel electrode covers the cover layer and connect the another transparent pixel electrode.

5. The LCD panel according to claim 3, wherein the active device array substrate further comprises a cover layer covering the first active device, the second active device, the first common line, the second common line, and a part of the transparent pixel electrode.

6. The LCD panel according to claim 2, wherein the reflective pixel electrode connects to another transparent pixel electrode that is disposed on the reflective pixel electrode.

7. A liquid crystal display (LCD) panel, comprising:
  an active device array substrate, comprising at least one pixel unit, wherein the pixel unit comprises:
    a first active device, comprising a first gate, a first source, and a first drain;
    a second active device, comprising a second gate, a second source, and a second drain, wherein the first gate is connected to the second gate, and the first source is connected to the second source;
    a first pixel electrode, connected to the first drain;
    a second pixel electrode, connected to the second drain;
    a first common line, connected to a first signal source;
    a second common line, connected to a second signal source, wherein the first signal source is different from the second signal source; and an opposite substrate, comprising a common electrode, wherein the common electrode comprises:
a first common sub-electrode, connected to the first signal source;
a second common sub-electrode, connected to a third signal source, wherein the third signal source is different from the first signal source and the second signal source; and
a liquid crystal layer, disposed between the active device array substrate and the opposite substrate.

8. The LCD panel according to claim 7, wherein the first signal source is adapted to provide a first voltage $\Delta V com1$, such that a coupling voltage $\Delta V1$ of the first pixel electrode is equal to $$\Delta V1 = \Delta Vcom1 \cdot \frac{Clc + Cst}{Cgs + Clc + Cst}, \text{ wherein}$$

Cst is a storage capacitance formed by the first common line and the first drain,
Cgs is a parasitic capacitance formed by the first gate and the first source,
Clc is a liquid crystal capacitance formed by the first pixel electrode and the common electrode.

9. The LCD panel according to claim 7, wherein the second signal source is adapted to provide a second voltage $\Delta Vcom2$, and the third signal source is adapted to provide a third voltage $\Delta Vcom3$, such that a coupling voltage $\Delta V2$ of the second pixel electrode is equal to $$\Delta V2 = \Delta Vcom2 \cdot \frac{Clc}{Cgs + Clc + Cst} + \Delta Vcom3 \cdot \frac{Cst}{Cgs + Clc + Cst},$$

wherein Cst is a storage capacitance formed by the second common line and the second drain,
Cgs is a parasitic capacitance formed by the second gate and the second source,
Clc is a liquid crystal capacitance formed by the second pixel electrode and the common electrode.

10. The LCD panel according to claim 7, wherein one of the first pixel electrode and the second pixel electrode is a transparent pixel electrode, and the other one of the first pixel electrode and the second pixel electrode is a reflective pixel electrode.

* * * * *